United States Patent
Arnold

(10) Patent No.: US 7,188,696 B2
(45) Date of Patent: Mar. 13, 2007

(54) MOTORCYCLE WITH A REAR-MOUNTED RADIATOR

(75) Inventor: David W. Arnold, Glendale, CA (US)

(73) Assignee: Honda Motor Co., Ltd., Tokyo (JP)

( * ) Notice: Subject to any disclaimer, the term of this patent is extended or adjusted under 35 U.S.C. 154(b) by 134 days.

(21) Appl. No.: 10/780,201

(22) Filed: Feb. 17, 2004

(65) Prior Publication Data

US 2005/0178597 A1  Aug. 18, 2005

(51) Int. Cl.
B60K 11/04  (2006.01)

(52) U.S. Cl. ........................ 180/229; 180/68.1

(58) Field of Classification Search ............ 180/219, 180/220, 68.1, 68.3, 68.4, 908, 65.1–65.4
See application file for complete search history.

(56) References Cited

U.S. PATENT DOCUMENTS

| | | |
|---|---|---|
| 4,010,812 A | 3/1977 | Bothwell |
| 4,366,880 A | 1/1983 | Miller et al. |
| 4,445,587 A | 5/1984 | Hillman |
| 4,577,720 A * | 3/1986 | Hamane et al. ............ 180/229 |
| 4,582,158 A * | 4/1986 | Hamane ..................... 180/229 |
| 4,632,206 A * | 12/1986 | Morinaka et al. .......... 180/229 |
| 4,660,624 A | 4/1987 | Yamaguchi |
| 4,876,778 A | 10/1989 | Hagihara et al. |
| 6,332,505 B1 | 12/2001 | Tateshima et al. |
| D461,157 S | 8/2002 | Myers et al. |
| 6,502,658 B1 | 1/2003 | Nagashii |
| 6,543,523 B2 | 4/2003 | Hasumi |
| 2003/0000755 A1 | 1/2003 | Schroeder |

FOREIGN PATENT DOCUMENTS

| | | |
|---|---|---|
| JP | 61-122180 | 8/1986 |
| JP | 62-11273 | 3/1987 |
| JP | 5-201375 | 8/1993 |
| JP | 5-330470 | 12/1993 |
| JP | 6-171568 | 6/1994 |
| JP | 2725185 | 12/1997 |
| JP | 2576872 | 5/1998 |
| JP | 2003-48588 | 2/2003 |

OTHER PUBLICATIONS www.benelli.com web page (1 sheet).
www.2wf.com web pages (2 sheets).
www.tornadobenelli.com web pages (12 sheets).

* cited by examiner

Primary Examiner—Lesley D. Morris
Assistant Examiner—L Lum
(74) Attorney, Agent, or Firm—Rankin, Hill, Porter & Clark LLP; Christen Millard

(57) ABSTRACT

A motorcycle is provided having front and rear wheels. A frame is supported on and connected to the front and rear wheels. The frame includes a rear swing frame pivotally connected to a front frame. A seat and an engine are mounted to the frame. The engine is disposed between the front and rear wheels. A radiator is mounted to the rear swing frame and is disposed between the engine and the rear wheel. A fan assembly is connected to the radiator and is disposed rearward of the radiator. An inner fender is disposed between the radiator and the rear wheel.

17 Claims, 6 Drawing Sheets

MOTORCYCLE WITH A REAR-MOUNTED RADIATOR

BACKGROUND OF THE INVENTION

The present invention is directed toward a cooling system for a motorcycle and, more particularly, toward a cooling system for a motorcycle, wherein the cooling system includes a rear-mounted radiator.

Conventionally, a motorcycle has a radiator mounted in front of the engine and behind the front forks. The radiator is mounted in this forward location to enable the radiator to receive cooling air during operation of the motorcycle. This forward location, however, is not without disadvantages. At least a portion of the cooling air is blocked by front portions of the motorcycle, such as the front wheel, front forks, front fender and fairing. Accordingly, the size of the radiator must be increased to obtain satisfactory cooling performance. This, in turn, increases the front profile of the motorcycle, which is aesthetically undesirable and adversely affects the aerodynamics of the motorcycle.

In order to address these disadvantages, it has been proposed to provide a motorcycle with a radiator that is mounted toward the rear of the motorcycle. Examples of such motorcycles are shown in Japanese Patent Publication No. JP6171568, Japanese Patent Publication No. 5201375, U.S. Pat. No. 4,445,587 to Hillman and U.S. Pat. No. 4,010,812 to Bothwell. Although a rear-mounted radiator improves the aesthetics and aerodynamics of a motorcycle, the placement of the radiator away from the front of the motorcycle presents other concerns. For example, a rearward mounting location must be provided having sufficient space for the radiator. In addition, an air provision system must provided to supply a sufficient amount of cooling air to the radiator and a heat exhaust system must be provided to direct heat away from the radiator and the rider of the motorcycle. Some of these concerns have been addressed, for example, by mounting the radiator in the rear fender of the motorcycle and providing an upwardly-directed fan, as is shown in Japanese Patent Publication No. JP6171568. Such solutions, however, are less than optimal and are not suitable for some styles of motorcycle.

Therefore, there exists a need in the art for a motorcycle having an improved cooling system that utilizes a rear mounted radiator. The present invention is directed to such a motorcycle.

SUMMARY OF THE INVENTION

In accordance with the present invention, a motorcycle is provided having front and rear wheels. A frame is supported on and connected to the front and rear wheels. An engine, a radiator and a seat are mounted to the frame. The engine is disposed between the front and rear wheels, while the radiator is disposed between the engine and the rear wheel.

In accordance with one feature of the present invention, the frame includes a rear swing frame pivotally connected to a front frame. The radiator is mounted to the rear swing frame.

In accordance with another feature of the present invention, the radiator is positioned such that an uppermost portion of the radiator is disposed at a lower level than an uppermost portion of the rear wheel.

In accordance with still another feature of the present invention, a fan assembly is disposed between the radiator and the rear wheel and is operable to draw air from the radiator and to direct the air rearwardly toward the rear wheel.

BRIEF DESCRIPTION OF THE DRAWINGS

The features, aspects, and advantages of the present invention will become better understood with regard to the following description, appended claims, and accompanying drawings where:

DETAILED DESCRIPTION OF THE PREFERRED EMBODIMENTS

Figure 1:
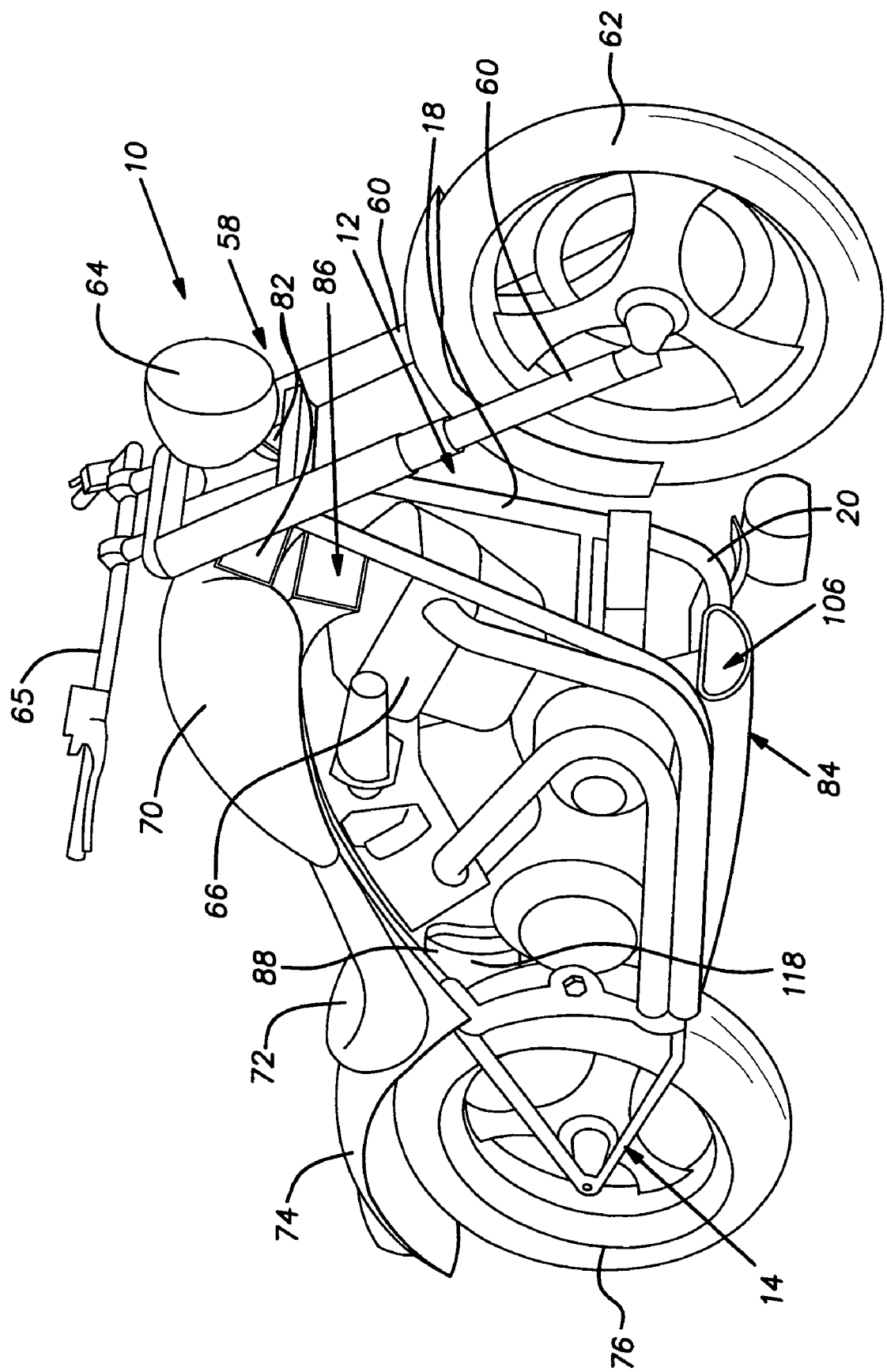
FIG. 1 is a front perspective view of a motorcycle having a cooling system and an air management system embodied in accordance with the present invention.

It should be noted that in the detailed description that follows, identical components have the same reference numerals, regardless of whether they are shown in different embodiments of the present invention. It should also be noted that in order to clearly and concisely disclose the present invention, the drawings may not necessarily be to scale and certain features of the invention may be shown in somewhat schematic form.

The present invention is directed to a motorcycle having a cooling system comprising a rear-mounted radiator.

Referring now to FIG. 1, there is shown a motorcycle 10 which incorporates the cooling system of the present invention. The motorcycle 10 has a frame that includes a front frame 12 and a rear swing arm or swing frame 14.

Figure 2:
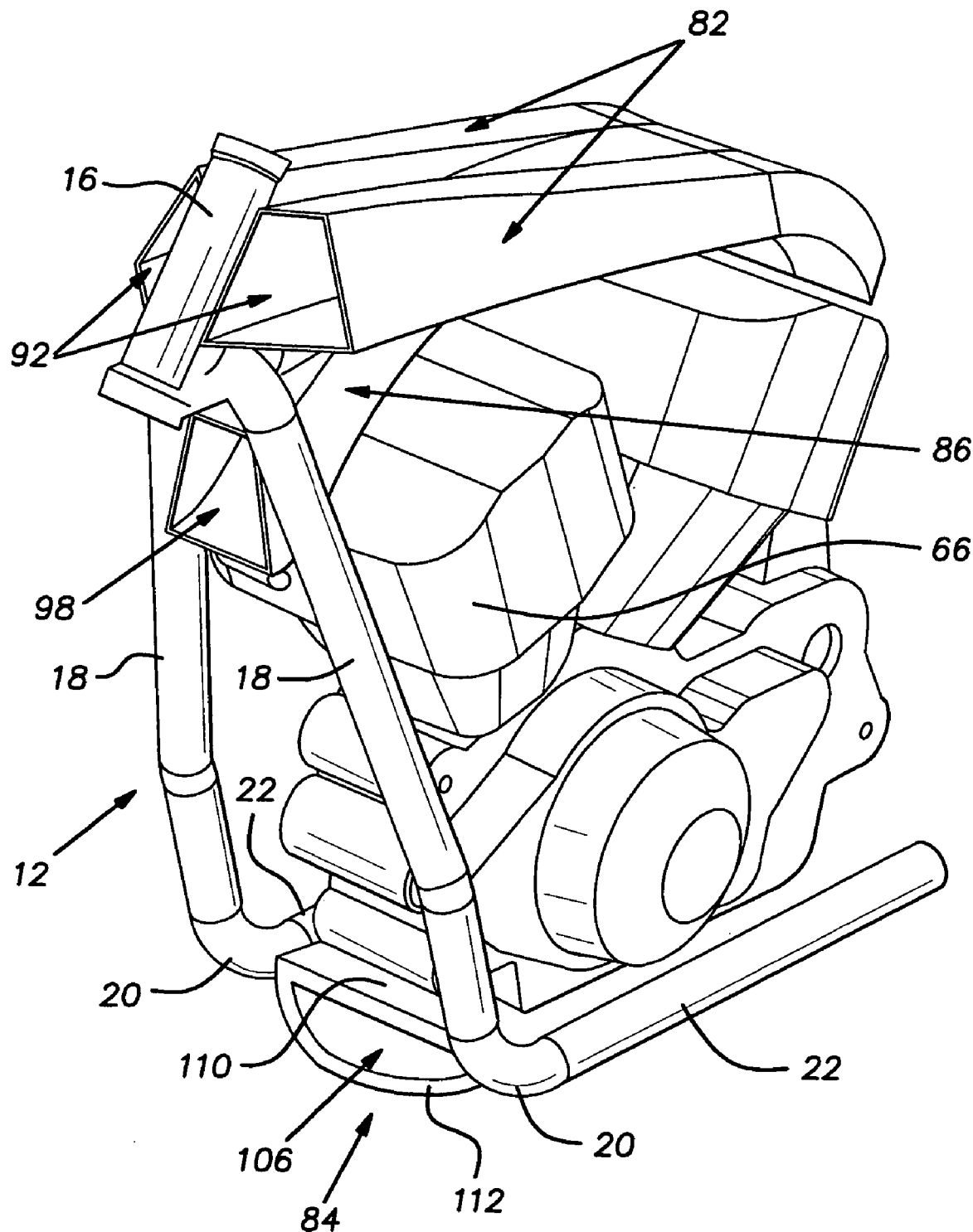
FIG. 2 is a front perspective view of a portion of a motorcycle substantially similar to the motorcycle shown in FIG. 1, showing a pair of top ducts and a middle duct of an air management system substantially similar to the air management system of the motorcycle shown in FIG. 1.
Figure 3:
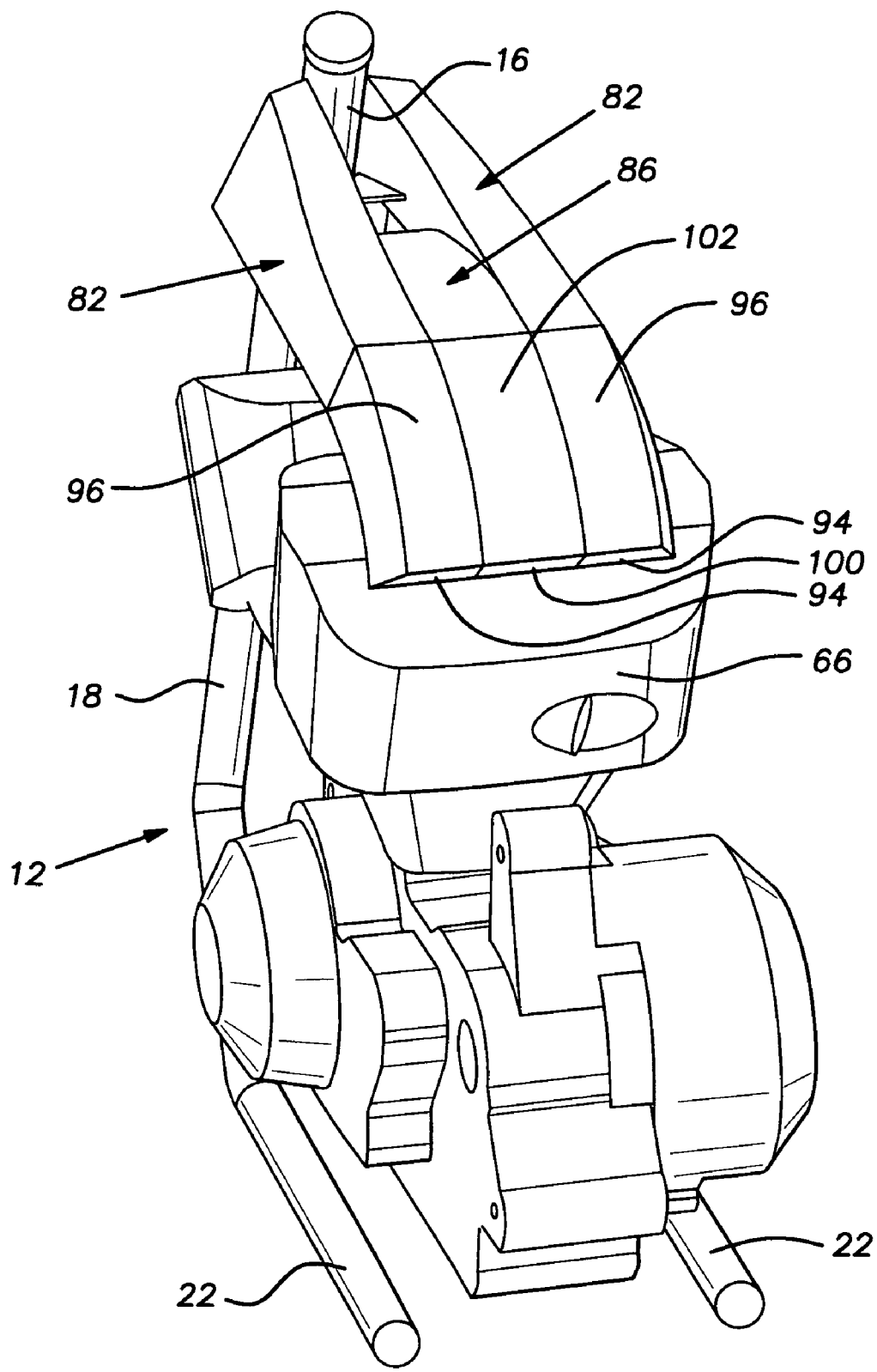
FIG. 3 is a rear perspective view of a portion of the motorcycle shown in FIG. 1, showing the top ducts and the middle duct of the air management system.
Figure 4:
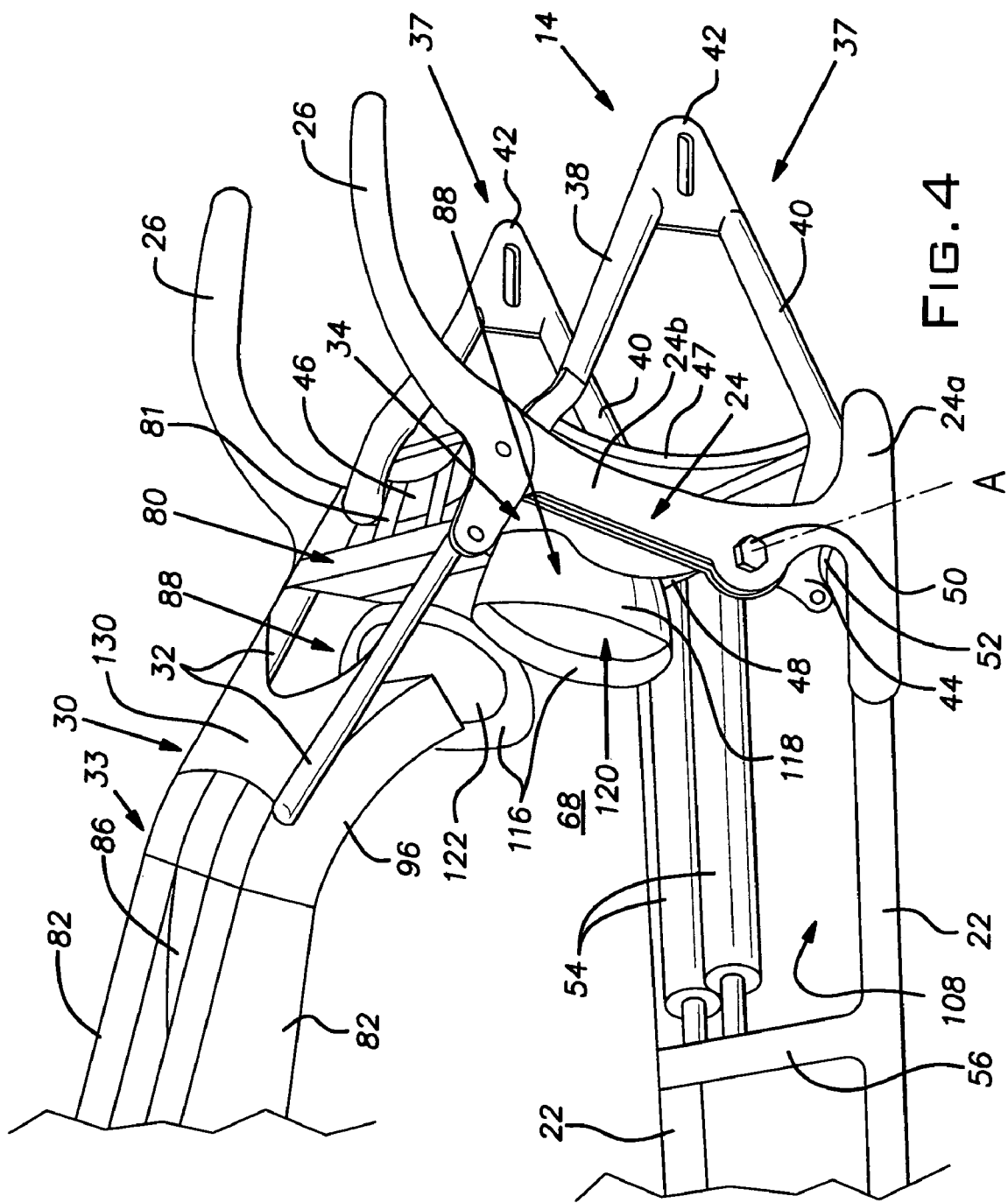
FIG. 4 is a side perspective view of a portion of the motorcycle shown in FIG. 1, showing a radiator of the cooling system and rear ducts of the air management system.

Referring now also to FIGS. 2, 3 and 4, the front frame 12 includes a steering head 16 with a pair of spaced-apart down tube or pipes 18 extending downwardly and rearwardly therefrom. Lower portions of the down pipes 18 are joined at bends 20 to a pair of bottom tubes or pipes 22 that extend rearwardly and are generally horizontally disposed. Rear portions of the bottom pipes 22 are fixed to a pair of rear stays 24, each of which includes a horizontal base portion 24a joined to a vertical post portion 24b having a rearward arc. Lower bent portions of a pair of fender supports 26 are secured to the post portions 24b, respectively. From the lower bent portions, the fender supports 26 curve upwardly and rearwardly to form continuations of the rearward arcs of the post portions 24b of the rear stays 24. A top frame structure 30 extends between the steering head 16 and the rear stays 24. As will be described more fully below, the top frame structure 30 may be comprised of a pair of seat rails 32 and a duct structure 33. The seat rails 32 are secured to the rear stays 24 and form a pair of corner regions 34 therewith.

Figure 6:
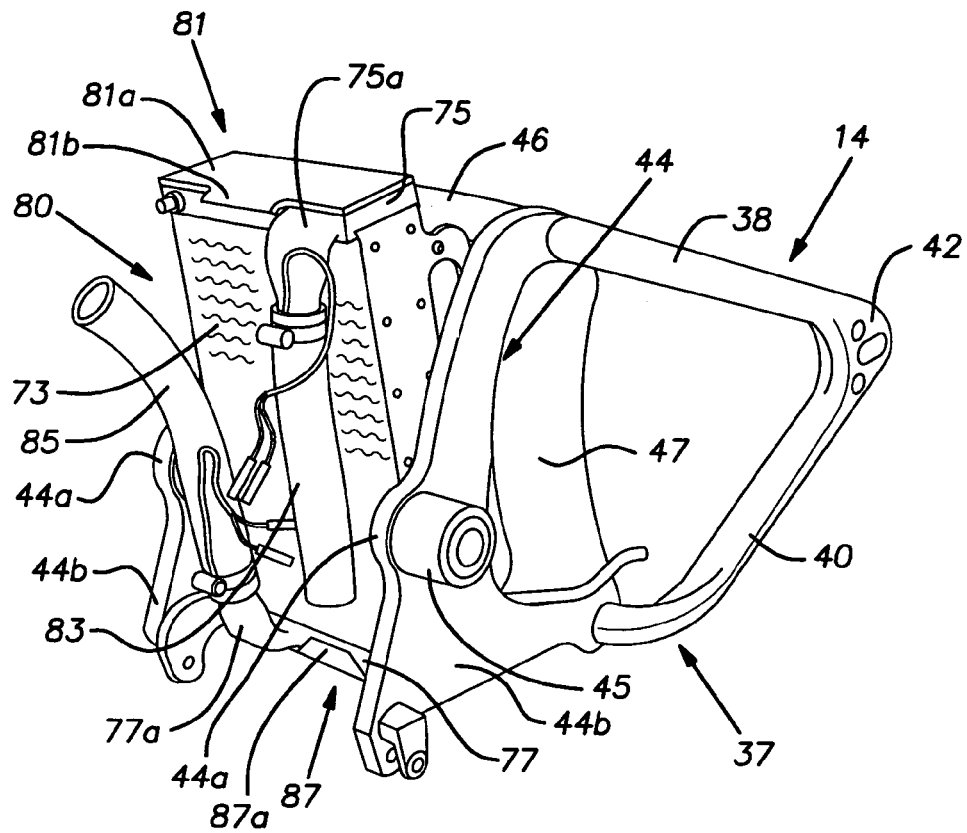
FIG. 6 is a perspective view of the radiator mounted to a rear swing frame of the motorcycle.
Figure 7:
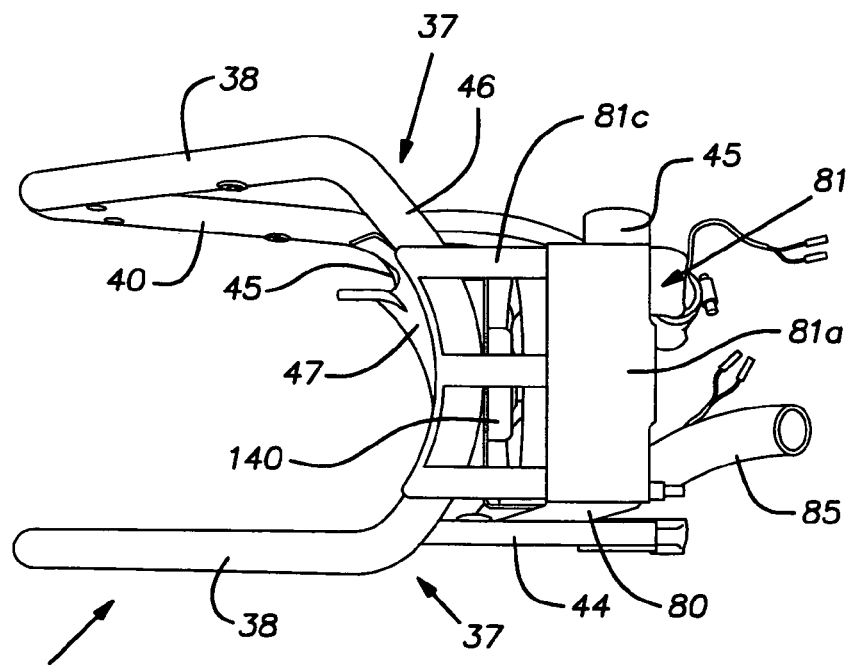
FIG. 7 is a top view of the radiator mounted to the rear swing frame.

Referring now to FIGS. 4, 6 and 7, the rear swing frame 14 has a generally triangular shape and includes a pair of generally triangular side structures 37, each of which includes a pair of upper and lower arms 38, 40 connected to a generally C-shaped forward mount 44. In each side structure 37, rearward ends of the upper and lower arms 38, 40 are joined together at a wheel mount 42 and forward portions of the upper and lower arms 38, 40 are joined to the forward mount 44. The upper and lower arms 38, 40 of each side structure 37 extend forwardly at acute angles to each other from the rear wheel mount 42 to the forward mount 44. The lower arms 40 are spaced apart and joined together by an arcuate transverse lower cross member 45, while the upper arms 38 are spaced apart and joined together by an arcuate transverse upper cross member 46. An arcuate shield plate or inner fender 47 is preferably secured to the rear swing frame 14. The inner fender 47 extends between the upper cross member 46 and the lower cross member 45 and between the side structures 37. The inner fender 47 may be secured to the upper cross member 46 and the lower cross member 45, as well as to the upper arms 38 and the lower arms 40. The inner fender 47 may have a rigid or semi-rigid construction and may be composed of plastic or metal, such as aluminum or steel.

The forward mounts 44 of the rear swing frame 14 include a pair of connection portions 44a, respectively, through which passages extend. A spacer structure 45 is secured to the connection portion 44a on a left or drive side of the rear swing frame 14 and has a passage extending therethrough that is aligned with the passage in the connection portion 44a. The forward mounts 44 are disposed between the rear stays 24 of the front frame 12 such that the passages in the forward mounts 44 are aligned with passages in the rear stays 24, respectively. The forward mounts 44 are pivotally connected to the rear stays 24 by a pivot axle 48 that extends between the forward mounts 44 and the post portions 24b of the rear stays 24. On each side of the frame, a pivot pin 50 extends through the aligned passages in the rear stay 24 and the forward mount 44 and is received in the pivot axle 48. The forward mounts 44 are connected by links 52 to a track member connected to posterior ends of a pair of shock absorbers 54, which are disposed between the bottom pipes 22 of the front frame 12. Anterior ends of the shock absorbers are connected to a cross member 56 secured between the bottom pipes 22.

Referring back to FIG. 1, a front fork assembly 58 is rotatably connected to the steering head 16. The front fork assembly 58 comprises a pair of elongated fork legs 60 that extend downwardly and forwardly from the steering head 16. A front wheel 62 is rotatably connected between the lower ends of the fork legs 60. A headlight 64 is secured to the front fork assembly 58 and is disposed between the upper ends of the fork legs 60. Handle bars 65 are connected to the front fork assembly 58 for moving the same.

A multi-cylinder, water-cooled engine 66 is secured to and supported by the front frame 12. The engine 66 is vertically disposed between the bottom pipes 22 and the top frame structure 30 and is longitudinally disposed between the down pipes 18 and the rear stays 24. A rear portion of the engine 66 is spaced forwardly from the rear stays 24 and the inner fender 47. In this manner, a rear cooling space 68 (shown in FIG. 4) is formed between the rear portion of the engine 66 and the inner fender 47. A fuel tank 70 is provided for supplying fuel to the engine 66. The fuel tank 70 is disposed over, and is secured to, the top frame structure 30, above the engine 66. A seat 72 is mounted to the seat rails 32 of the front frame 12 and is disposed rearwardly of the fuel tank 70. The seat 72 may extend over a rear fender 74 that is secured to the fender supports 26. A rear wheel 76 is rotatably connected between the rear wheel mounts 42 of the rear swing frame 14. The rear wheel 76 is driven by the engine 66 through a suitable drive system known in the art. For example, the engine 66 may drive the rear wheel 76 through a drive chain, a rotatable drive shaft, or an endless toothed drive belt.

Referring now to in FIGS. 4–7, the cooling system's radiator (which is designated by the reference numeral 80) is shown. The radiator 80 has a rectangular shape and is preferably secured to the rear swing frame 14, as is shown in FIGS. 4, 6 and 7. The radiator 80, however, may instead be secured to the front frame 12. For example, the radiator 80 may be connected to the seat rails 32 and the bottom pipes 22. Regardless of whether the radiator 80 is secured to the rear swing frame 14 or the front frame 12, the radiator 80 is disposed in the cooling space 68 between the engine 66 and the inner fender 47 and is positioned so as to be below the seat 72. In addition, an uppermost portion of the radiator 80 is preferably disposed at a lower level than an uppermost portion of the rear wheel 76.

The radiator 80 includes a core 73 disposed between an inlet tank 75 and an outlet tank 77. The core 73 includes two or more sections, each of which comprises a plurality of spaced-apart tubes 78 and corrugated cooling fins 79 (shown in FIG. 5). In each section, the tubes 78 extend vertically between the inlet and outlet tanks 75, 77 and the corrugated cooling fins 79 are disposed between the tubes 78. The inlet tank 75 has an inlet 75a connected to the engine 66 by an inlet line 83, while the outlet tank 77 has an outlet 77a connected to the engine 66 by an outlet line 85. A bottom wall (not shown) of the inlet tank 75 has openings formed therein that are connected to inlets of the tubes 78, while a top wall (not shown) of the outlet tank 77 has openings formed therein that are connected to outlets of the tubes 78. In this manner, heated water from the engine 66 travels through the inlet line 83, enters the inlet tank 75 through the inlet 75a and passes through the tubes 78 to the outlet tank 77. Cooled water from the outlet tank 77 then travels through the outlet 77a to the outlet line 85 and then back to the engine 66. As will be described in further detail below, a fan assembly 140 (shown in FIGS. 5–7) is preferably provided to draw air from the radiator 80 and to direct the air rearwardly toward the rear wheel 76.

The radiator 80 is preferably secured to the rear swing frame 14 by a top mounting bracket 81 and a bottom mounting bracket 87. The top mounting bracket 81 includes a front plate portion 81a with a front lip 81b extending downwardly from a front edge thereof and a rear gapped portion 81c having a pair of enlarged openings formed therein. The bottom mounting bracket 87 includes a plate portion (not shown) with a front lip 87a extending upwardly from a front edge thereof and a rear flange extending upwardly from a rear edge thereof. The bottom mounting bracket 87 is disposed between lower leg portions 44b of the forward mount 44 and is secured to the lower cross member 45. The gapped portion 81c of the top mounting bracket 81 is bent downwardly along a bend and is removably secured to the upper cross member 46 of the rear swing frame 14. The front plate portion 81a of the top mounting bracket 81 is disposed over and against a top surface of the inlet tank 75, with the lip 81b disposed forward of and against a front surface of the inlet tank 75, thereby trapping the inlet tank 75 between the lip 81b and the bend. A bottom surface of the outlet tank 77 is supported on the plate portion of the bottom mounting bracket 87, with the front lip 87a disposed forward of and against a front surface of the outlet tank 77 and the rear flanges disposed rearward of and against a rear surface of the outlet tank 77, thereby trapping the outlet tank 77 between the front lip 87*a* and the rear flange (not shown). With the radiator 80 mounted in the foregoing manner, the radiator 80 is vertically trapped between the top and bottom mounting brackets 81, 87. In addition, the radiator 80 is laterally disposed between the forward mounts 44 of the rear swing frame 14 and is longitudinally disposed between the engine 66 and the rear wheel 76. More specifically, the radiator 80 is longitudinally disposed between the pivot axle 48 (and pivot axis) and the inner fender 47.

It should be appreciated that an alternate mounting design may be used to mount the radiator 80 to the rear swing frame 14, or to mount the radiator 80 to the front frame 12, as contemplated above. If such an alternate mounting design is utilized, then the radiator 80 may have a different position relative to the pivot axle 48 (and pivot axis). For example, the radiator 80 may be mounted so as to be located forward of the pivot axle 48 (and pivot axis), i.e., between the engine 66 and the pivot axle 48 (and pivot axis). The radiator 80 may also be especially constructed and positioned such that the pivot axle 48 (and pivot axis) extends through the radiator 80.

With the radiator 80 positioned as described above, the radiator 80 is shielded from the rear wheel 76 by the inner fender 47, which is disposed between the radiator 80 and the rear wheel 76. The inner fender 47 blocks debris thrown up by the rear wheel 76 so as to prevent such debris from impinging against the radiator 80 and the fan assembly 140 and thereby damaging the radiator 80 and/or the fan assembly 140. In addition, the inner fender 47 blocks air turbulence generated by the rear wheel 76 so as to prevent such air turbulence from interfering with the flow of warm air exiting from the rear of the radiator 80 and the fan assembly 140. In addition to shielding the radiator 80 and the fan assembly 140 from the rear wheel 76, the inner fender 47 also shields the rear wheel 76 from the warm air exiting the radiator 80 and the fan assembly 140, i.e., the inner fender 47 blocks the warm air exiting the radiator 80 and the fan assembly 140 so as to prevent the warm air from heating up the tire of the rear wheel 76. More specifically, the inner fender 47 cooperates with an inner surface of the rear fender 74 to define an air egress channel that guides the warm air upward and rearward, between the inner fender 47 and the rear fender 74. With the warm air being conducted upward and rearward through the egress channel, both the rear wheel 76 and the seat 72 (and, thus, the operator) are substantially insulated and, thus, protected from the warm air.

It should be appreciated that the inner fender 47 may be mounted to the front frame 12, instead of the rear swing frame 14, as described above. Such an alternate mounting of the inner fender 47 may be utilized in connection with an alternate mounting design of the radiator 80, as contemplated above. Preferably, any such alternate mounting of the inner fender 47 and/or the radiator 80 is accomplished so as to retain the benefits of the mounting of the inner fender 47 and the radiator 80 described above, namely providing protection for the radiator 80 and the rear wheel 76 and guiding warm air from the radiator 80 upward and rearward.

With the construction described above, the motorcycle 10 has a longitudinal plane about which the motorcycle 10 is generally laterally symmetrical. The longitudinal plane extends through the steering head 16 and the front and rear wheels 62, 76.

The radiator 80 is supplied with cooling air by an air management system. The air management system comprises a plurality of air ducts that guide cooling air from the front of the motorcycle 10 to the rear cooling space 68 between the engine 66 and the inner fender 47. More specifically, the air management system comprises top ducts 82, a bottom duct 84, a middle duct 86 and a pair of rear ducts 88.

Referring now to FIGS. 1–3, the top ducts 82 define air passages extending rearward from the steering head 16 to the cooling space 68, or proximate to the cooling space 68. The top ducts 82 are disposed on opposing sides of the longitudinal plane of the motorcycle 10 and are positioned above the engine 66. The top ducts 82 each include an inlet 92 and an outlet 94 and are preferably enclosed, except for the inlets 92 and the outlets 94. The top ducts 82 may be channel-shaped, as shown, or tube shaped. If the top ducts 82 are channel-shaped, they may have a trapezoidal cross-section, as shown. The top ducts 82 may have a rigid or semi-rigid construction and may be composed of metal or plastic. When the top ducts 82 help form the top frame structure 30, the top ducts 82 have a rigid construction and are composed of a metal, such as steel, and the inside walls of the top ducts 82 (toward the inlets 92) are joined by welding and/or other securement means to opposing sides of the steering head 16, respectively.

The inlets 92 of the top ducts 82 are disposed on opposing sides of the steering head 16 and the longitudinal plane of the motorcycle 10. The inlets 92 are longitudinally positioned so as to be disposed at, or slightly rearward of, the center axis of the steering head 16. The inlets 92, however, may be disposed more forwardly. For example, the inlets 92 may be longitudinally positioned so as to be disposed at, or slightly rearward, of a lens of the headlight 64. The inlets 92 face forward and preferably have a slight rearward and outward slant. The outlets 94 of the top ducts 82 are also disposed on opposing sides of the longitudinal plane of the motorcycle 10. Rear portions 96 of the top ducts 82 curve downwardly such that the outlets 94 face rearward and downward. The outlets 94 are longitudinally positioned so as to be disposed in the cooling space 68, or so as to be in substantially unimpeded air flow communication with the cooling space 68 and the radiator 80. In this manner, the outlets 94 are positioned so as to permit air exiting the top ducts 82 to travel substantially unimpeded to the radiator 80.

The middle duct 86 defines an air passage that extends arcuately rearward from the steering head 16 to the cooling space 68, or proximate to the cooling space 68. The middle duct 86 is longitudinally divided by the longitudinal plane of the motorcycle 10, i.e., the longitudinal plane of the motorcycle 10 extends through the middle duct 86. The middle duct 86 is disposed over the engine 66 and may be secured between the top ducts 82. The middle duct 86 includes an inlet 98 and an outlet 100 and is preferably enclosed, except for the inlet 98 and the outlet 100. The middle duct 86 may be channel-shaped, as shown, or tube shaped. If the middle duct 86 is channel-shaped, it may have a trapezoidal cross-section, as shown. The middle duct 86 may have a rigid or semi-rigid construction and may be composed of metal or plastic. When the middle duct 86 helps form the top frame structure 30, the middle duct 86 has a rigid construction and is composed of a metal, such as steel.

The inlet 98 of the middle duct 86 is disposed below the steering head 16 and, thus, is disposed below the inlets 92 of the top ducts 82. The inlet 98 of the middle duct 86 faces forward and is divided by the longitudinal plane of the motorcycle 10. The inlet 98 is laterally aligned with a space between the down pipes 18. As shown in FIG. 1, the inlet 98 may be longitudinally positioned so as to be disposed rearward from the down pipes 18. The inlet 98, however, may be disposed more forwardly. For example, the inlet 98 may be disposed between the down pipes 18 and substantially in alignment with the inlets 92 of the top ducts 82, as shown in FIG. 2. The outlet 100 of the middle duct 86 is divided by the longitudinal plane of the motorcycle 10. A rear portion 102 of the middle duct 86 curves downwardly such that the outlet 100 faces rearward and downward. The outlet 100 of the middle duct 86 is disposed between the outlets 94 of the top ducts 82 and is preferably laterally and longitudinally aligned with the outlets 94 of the top ducts 82. In this manner, the outlet 100 and the outlets 94 form a laterally extending line of rearwardly and downwardly extending outlets. As with the outlets 94 of the top ducts 82, the outlet 100 of the middle duct 86 is positioned so as to permit air exiting the middle duct 86 to travel substantially unimpeded to the radiator 80.

The bottom duct 84 defines an air passage extending from the bends 20 to the cooling space 68, or proximate to the cooling space 68. The bottom duct 84 is longitudinally divided by the longitudinal plane of the motorcycle 10, i.e., the longitudinal plane of the motorcycle 10 extends through the bottom duct 84. The bottom duct 84 is disposed below the engine 66 and between the bottom pipes 22, and may be secured to the bottom pipes 22. The bottom duct 84 includes an inlet 106 and an outlet 108 and is preferably enclosed, except for the inlet 106 and the outlet 108. The bottom duct 84 is preferably scoop-shaped, having a flat top wall 110 and an arcuate bottom wall 112. The bottom duct 84 may have a rigid or semi-rigid construction and may be composed of plastic or a metal, such as aluminum or steel.

The inlet 106 of the bottom duct 84 is disposed below the engine 66 and is longitudinally positioned so as to be forward of at least a majority of the engine 66 and disposed at, or slightly rearward or forward of, the bends 20. The inlet 106 of the bottom duct 84 faces forward and is divided by the longitudinal plane of the motorcycle 10. The outlet 108 of the bottom duct 84 faces upwardly. A substantial portion of the top wall 110 of the bottom duct 84 may be removed under the engine 66 and the cooling space 68. In this regard, a bottom portion of the engine 66 may form part of the top of the bottom duct 84. The outlet 108 is longitudinally positioned so as to be disposed in the cooling space 68, or so as to be in substantially unimpeded air flow communication with the cooling space 68 and the radiator 80. In this manner, the outlet 108 is positioned so as to permit air exiting the bottom duct 84 to travel substantially unimpeded to the radiator 80.

The rear ducts 88 define laterally inward and rearwardly extending air passages. The rear ducts 88 are disposed on opposing sides of the longitudinal plane of the motorcycle 10, below the seat 72 and rearwardly and outwardly of the engine 66. More preferably, the rear ducts 88 are disposed in the corner regions 34 between the rear stays 24 and the seat rails 32. The rear ducts 88 may be secured to the rear stays 24, respectively or to an air box surrounding the radiator 80. Each of the rear ducts 88 is preferably scoop-shaped, having a flat inner wall 116 and an arcuate outer wall 118. The rear ducts 88 may have rigid or semi-rigid constructions and may be composed of plastic or a metal, such as aluminum or steel.

Inlets 120 of the rear ducts 88 are formed between the inner and outer walls 116, 118 and face forward. The inlets 120 are disposed on opposing sides of the radiator 80 and the longitudinal plane of the motorcycle 10. Outlets 122 of the rear ducts 88 are formed in the inner walls 116 and face inwardly. The outlets 122 are positioned so as to be disposed in the cooling space 68, or so as to be in substantially unimpeded air flow communication with the cooling space 68 and the radiator 80. In this manner, the outlets 122 are positioned so as to permit air exiting the rear ducts 88 to travel substantially unimpeded to the radiator 80.

Referring now to FIG. 4, the top ducts 82 and the middle duct 86 are secured together to form the duct structure 33. Preferably, the top ducts 82 and the middle duct 86 are secured together so that inner and outer side walls of the middle duct 86 (at least in the rear portion 102 thereof respectively adjoin inner side walls of the top ducts 82 (at least in the rear portions 96 thereof. The top ducts 82 and the middle duct 86 may be joined together by welding or other securement means. The duct structure 33 is joined to forward portions of the seat rails 32 by welding or other securement means. A brace 130 may be disposed between the seat rails 32, proximate to the juncture of the seat rails 32 and the duct structure 33, and may be secured to the seat rails 32, respectively, as well as to the duct structure 33. Together, the duct structure 33 (comprising the top ducts 82 and the middle duct 86), the brace 130 and the seat rails 32 form the top frame structure 30. As set forth above, inside walls of the top ducts 82 (toward the inlets 92) are joined by welding and/or other securement means to opposing sides of the steering head 16, respectively, and rear portions of the seat rails 32 are secured to the rear stays 24. In this manner, the top frame structure 30 has a front portion secured to the steering head 16 and a rear portion secured to the rear stays 24.

With the construction described above, the top frame structure 30 forms a unique frame structure, which, in addition to being an integral portion of the front frame 12, functions as a conduit for conducting air from the front of the motorcycle 10 to the rear-mounted radiator 80.

When the motorcycle 10 is moving forward, air enters the top ducts 82, the middle duct 86, the bottom duct 84 and the rear ducts 88. Air streams in the top ducts 82 and the middle duct 86 move rearwardly over the engine 66 and then exit through the outlets 94, 100, moving rearwardly and downwardly into the cooling space 68 and against the radiator 80. Air streams in the rear ducts 88 are directed laterally inward, moving into the cooling space 68 through the outlets 122 and thence against the radiator 80. Air in the bottom duct 84 moves rearwardly under the engine 66 and then exits through the outlet 104, moving upwardly and rearwardly into the cooling space 68 and against the radiator 80. In this manner, the air management system produces air streams that impinge upon the radiator 80 from top, bottom and side directions. Heated air exits the radiator 80 and passes through the air egress channel, which guides the warm air upward and rearward, between the inner fender 47 and the rear fender 74. The fan assembly 140 helps draw air through the radiator 80.

Figure 5:
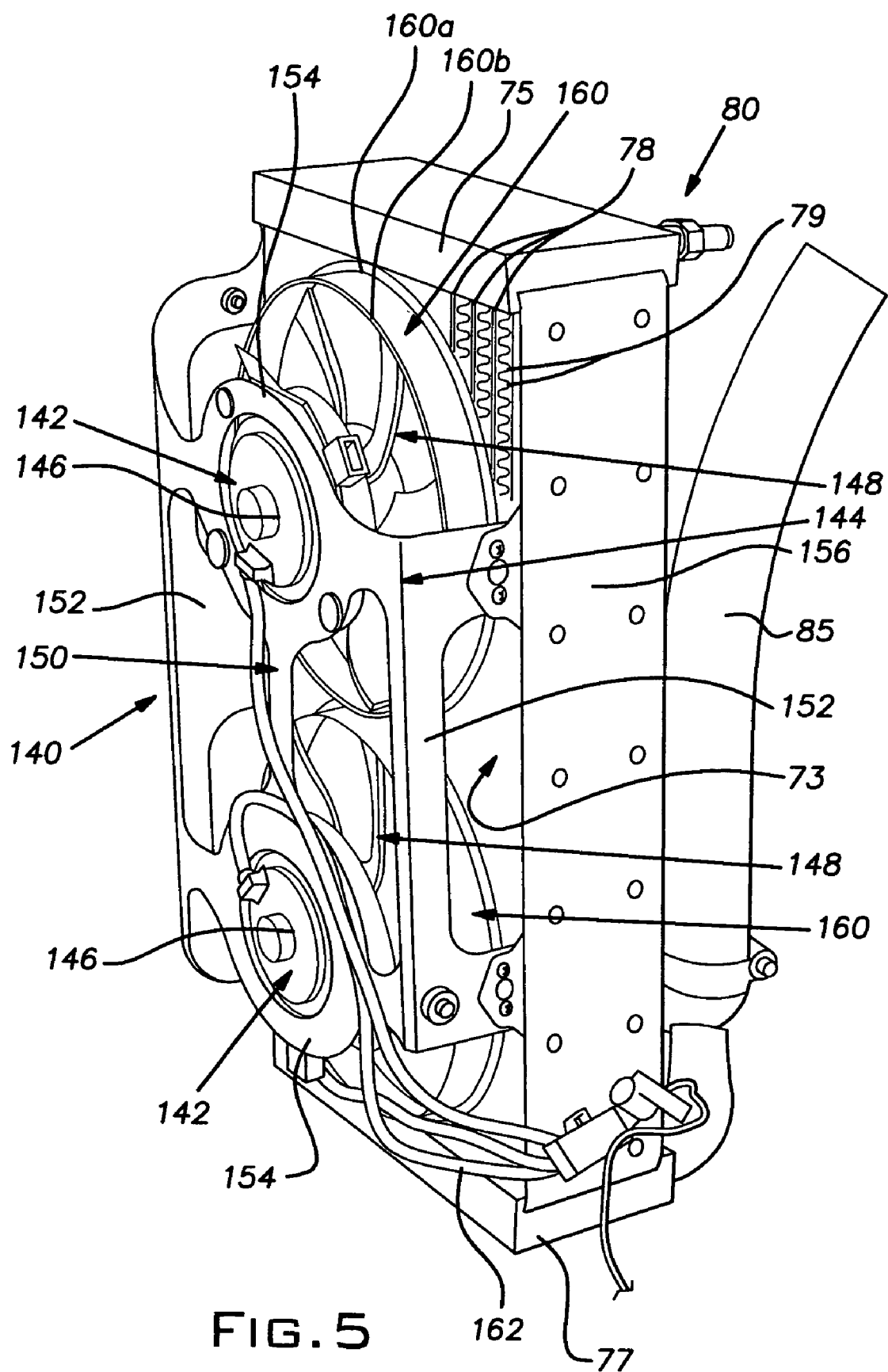
FIG. 5 is a perspective view of the radiator.

Referring now to FIG. 5, the fan assembly 140 includes a pair of fans 142 secured to a mounting cage 144. Each of the fans 142 includes an electric motor 146 having a rotatable shaft secured to an impeller 148. The mounting cage 144 includes a rear structure 150 secured between a pair of forwardly-extending side structures 152. The rear structure 150 includes a pair of vertically arranged holding rings 154 to which the motors 146 are secured, respectively, such that rear portions of the motors 146 extend through openings in the holding rings 154. The side structures 152 of the mounting cage 144 are secured to side brackets 156 of the radiator 80 and space the rear structure 150 rearwardly from the radiator 80. In this manner, the mounting cage 144 positions the fans 142 rearward of, and in alignment with the radiator 80.

In each of the fans 142, a shroud 160 is disposed around the impeller 148 and is secured to outer edges of blades of the impeller 148 so as to permit the shroud 160 to rotate with the impeller 148. Each shroud 160 is generally cylindrical and has a bell-shaped inlet 160a and a bell-shaped outlet 160b. The inlets 160a of the shrouds 160 are each spaced a small distance rearward from the rear of the core 73 of the radiator 80. The shrouds 160 are provided to improve air flow through the radiator 80 (especially during idling and low speed) and are preferably constructed in accordance with U.S. Pat. No. 6,543,523 to Hasumi, which is assigned to the assignee of the present invention and is incorporated herein by reference. The shroud construction in the Hasumi patent reduces the amount of noise generated by the shroud, which is desirable in the present invention, considering how the radiator 80 and the fan assembly 140 are disposed under the seat 72.

The motors 146 of the fans 142 are provided with electric power through wiring 162 connected to an electrical power system of the motorcycle 10. Power to the motors 146 is controlled by a thermoswitch located on the outlet tank 77 of the radiator 80. When the temperature of the water in the outlet tank 77 rises above a certain temperature, the thermoswitch closes and power is provided to the motors 146, thereby rotating the impellers 148 and drawing air through the radiator 80.

While the invention has been shown and described with respect to particular embodiments thereof, those embodiments are for the purpose of illustration rather than limitation, and other variations and modifications of the specific embodiments herein described will be apparent to those skilled in the art, all within the intended spirit and scope of the invention. Accordingly, the invention is not to be limited in scope and effect to the specific embodiments herein described, nor in any other way that is inconsistent with the extent to which the progress in the art has been advanced by the invention.

What is claimed is:

1. A motorcycle comprising:
    (a.) front and rear wheels;
    (b.) a frame supported on and connected to the front and rear wheels, said frame including a rear swing frame pivotally connected to a front frame;
    (c.) an engine mounted to the frame and disposed between the front and rear wheels;
    (d.) a seat mounted to the frame; and
    (e.) a radiator mounted to the rear swing frame and disposed between the engine and the rear wheel.

2. The motorcycle of claim 1, wherein the rear swing frame is pivotable along a pivot axis disposed perpendicular to a longitudinal axis of the motorcycle, and wherein the radiator is disposed rearward of the pivot axis.

3. The motorcycle of claim 1, wherein the radiator is disposed below the seat.

4. The motorcycle of claim 1, wherein the rear swing frame comprises:
    a pair of side structures, each comprising a pair of upper and lower arms, wherein in each of the side structures, rear portions of the upper and lower arms are secured together at a wheel mount and forward portions of the upper and lower arms are secured to a forward mount;
    a transverse upper cross member extending between the upper arms; and
    a transverse lower cross member extending between the lower arms; and
    wherein the rear wheel is disposed between the side structures and is rotatably mounted to the wheel mounts.

5. The motorcycle of claim 4, wherein the radiator is disposed between the side structures.

6. The motorcycle of claim 5, wherein the front frame comprises:
    a steering head;
    a pair of spaced-apart down pipes secured to the steering head and extending downwardly and rearwardly therefrom;
    a pair of bottom pipes joined at bends to bottom portions of the down pipes, respectively, and extending rearwardly therefrom; and
    a pair of rear stays secured to the bottom pipes, respectively, and extending upwardly therefrom.

7. The motorcycle of claim 6, wherein the side structures of the rear swing frame are connected to the rear stays of the front frame so as to be pivotable along a pivot axis extending perpendicular to a longitudinal axis of the motorcycle, and wherein the radiator is disposed rearward of the pivot axis.

8. The motorcycle of claim 5, wherein the radiator comprises a core disposed between an inlet tank and an outlet tank, and wherein the inlet tank of the radiator is connected to the upper cross member of the swing frame.

9. The motorcycle of claim 8, wherein the outlet tank of the radiator is connected to the lower cross member of the rear swing frame.

10. The motorcycle of claim 1, further comprising an air management system comprising at least one air duct for guiding cooling air to the radiator.

11. The motorcycle of claim 10, wherein the at least one duct comprises a plurality of air ducts.

12. A motorcycle comprising:
    (a.) front and rear wheels;
    (b.) a frame supported on and connected to the front and rear wheels;
    (c.) an engine mounted to the frame and disposed between the front and rear wheels;
    (d.) a seat mounted to the frame; and
    (e.) a radiator mounted to the frame and disposed between the engine and the rear wheel, said radiator being positioned such that an uppermost portion of the radiator is disposed at a lower level than an uppermost portion of the rear wheel.

13. The motorcycle of claim 12, wherein the frame comprises a rear swing frame pivotally connected to a front frame.

14. The motorcycle of claim 13, further comprising an outer fender connected to the front frame and an inner fender connected to the rear swing frame and disposed between the radiator and the rear wheel.

15. The motorcycle of claim 14, further comprising at least one fan disposed between the radiator and the inner fender.

16. The motorcycle of claim 13, wherein the rear swing frame comprises:
    a pair of side structures, each comprising a pair of upper and lower arms, wherein in each of the side structures, rear portions of the upper and lower arms are secured together at a wheel mount and forward portions of the upper and lower arms are secured to the forward mount;
    a transverse upper cross member extending between the upper arms; and
    a transverse lower cross member extending between the lower arms; and
    wherein the rear wheel is disposed between the side structures and is rotatably mounted to the wheel mounts.

17. The motorcycle of claim 16, wherein an upper portion of the radiator is connected to the upper cross member of the swing frame and a lower portion of the radiator is connected to the lower cross member of the rear swing frame.

* * * * *